(12) United States Patent
Seo

(10) Patent No.: US 7,203,470 B2
(45) Date of Patent: Apr. 10, 2007

(54) PHASE COMBINING DIVERSITY RECEIVING APPARATUS AND METHOD

(75) Inventor: Mun-Kyo Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 501 days.

(21) Appl. No.: 10/751,812

(22) Filed: Jan. 6, 2004

(65) Prior Publication Data

US 2004/0137857 A1 Jul. 15, 2004

(30) Foreign Application Priority Data

Jan. 7, 2003 (KR) .................... 10-2003-0000783

(51) Int. Cl.
*H04B 1/16* (2006.01)

(52) U.S. Cl. .................... 455/139; 455/273; 455/276.1

(58) Field of Classification Search .............. 455/132, 455/137, 138, 139, 272, 273, 276.1; 375/347
See application file for complete search history.

(56) References Cited

U.S. PATENT DOCUMENTS

| | | | | |
|---|---|---|---|---|
| 4,334,316 | A | * | 6/1982 | Tanaka ................. 455/139 |
| 5,280,637 | A | | 1/1994 | Larosa et al. |
| 5,361,404 | A | | 11/1994 | Dent ..................... 455/135 |
| 6,115,591 | A | | 9/2000 | Hwang |
| 6,201,955 | B1 | | 3/2001 | Jasper et al. |
| 2003/0072396 | A1 | * | 4/2003 | Binshtok et al. ........... 375/346 |

FOREIGN PATENT DOCUMENTS

| | | |
|---|---|---|
| EP | 0 477 158 A2 | 3/1992 |
| EP | 0477158 A | 3/1992 |
| EP | 0546806 A | 6/1993 |
| EP | 1033825 A | 9/2000 |
| EP | 1033826 A | 9/2000 |
| JP | 55-174613 | 12/1980 |
| JP | 56-136039 | 10/1981 |
| JP | 57-98060 | 6/1982 |
| JP | 2004-222124 | 8/1992 |
| JP | 2000-278243 | 10/2000 |

(Continued)

OTHER PUBLICATIONS

Chung-Ning Zhang et al., "A low-complexity antenna diversity receiver suitable for TDMA handset implementation", Vehicular Technology Conference, 1997, New York, NY, USA, IEEE, pp. 1753-1757.

(Continued)

*Primary Examiner*—Nguyen T. Vo
(74) *Attorney, Agent, or Firm*—Ked & Associates, LLP

(57) ABSTRACT

An in-phase combining diversity receiving apparatus is disclosed by which the size (gain) of a receiving signal as well as its phase is controlled and signals received through each antenna pass through different paths so that an imbalance of receiving signal power is solved. The diversity receiving apparatus includes a first signal adjusting unit for amplifying a first signal received by a first antenna and for phase-shifting, a second signal adjusting unit for amplifying a second signal received by the second antenna and for phase-shifting, and a controller. The controller operates as to measure powers of an original receiving signal, the first signal and the second signal, and controls the first and second signal adjusting units.

28 Claims, 3 Drawing Sheets

FOREIGN PATENT DOCUMENTS

| | | |
|---|---|---|
| JP | 2001-028561 | 1/2001 |
| JP | 2001-160708 | 6/2001 |
| KR | 1996-51901 | 11/1996 |

OTHER PUBLICATIONS

Search Report.
Japanese Office Action (May 23, 2005).
Chun-Ning Zhang et al: "A Low-Complexity Antenna Diversity Receiver Suitable For TDMA Handset Implementation", Vehicular Technology Conference, May 4, 1997, pp. 1753-1757, XP010229068.
KR Office Action dated Apr. 29, 2005.
English Translation of Chinese Office Action dated Mar. 3, 2006.
Japanese Office Action dated Jul. 18, 2006.

* cited by examiner

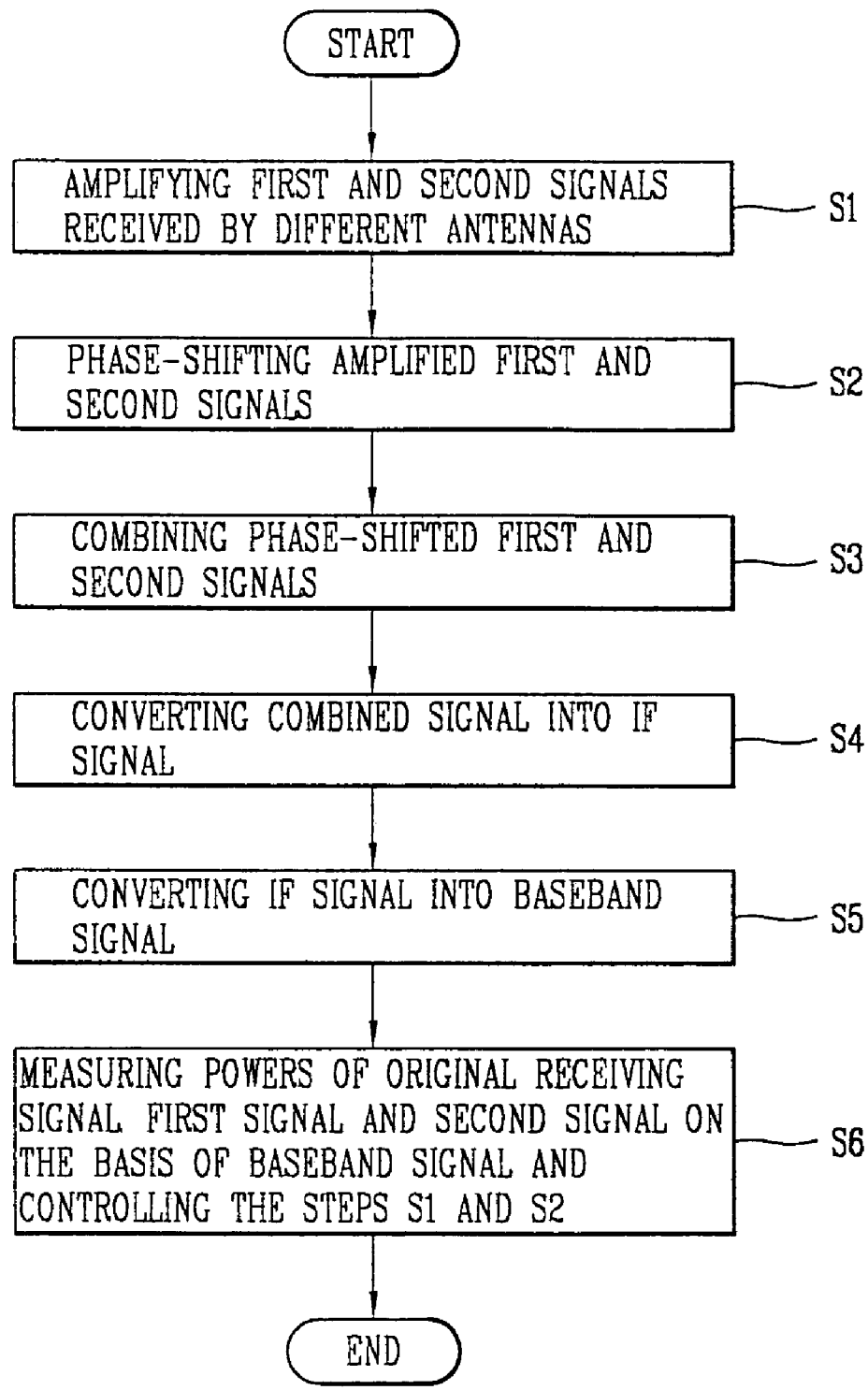

PHASE COMBINING DIVERSITY RECEIVING APPARATUS AND METHOD

BACKGROUND OF THE INVENTION

1. Field of the Invention

The present invention relates to a receiving apparatus of a radio communication system and, more particularly, to a diversity receiving apparatus.

2. Background of the Related Art

A diversity technique is used to improve a quality of a received signal in an analog or a digital radio communication system.

The diversity system generally includes two or more antennas and signals received through each antenna are suitably selected, switched or combined, so that a better quality of a received signal is obtained compared to a receiving device which uses only one antenna.

In a high data rate (HDR) system, one of the third-generation synchronous mobile communication standards in service, the diversity technique is highly recommended for the receiving unit of a terminal.

The receiving unit of the HDR terminal adopts an adaptive modulation method according to a received signal quality. Generally, the better the quality of a received signal a terminal has, the faster it can receive data. Thus, influence of a receiving performance of the terminal on an overall system is even stronger compared to existing second-generation mobile communication systems.

Diversity techniques include a selection or switching technique, an in-phase combining or equal-gain combining technique, and a maximal ratio combining technique.

The selection technique operates as to selectively receive the strongest signal among signals received by a plurality of antennas. Thus, as long as all signals received by the plurality of antennas do not simultaneously drop down to below a reception sensitivity, a reception signal quality above a certain level can be obtained.

In order to use the selection technique, a controller of a receiving side should be aware of a strength of each signal received by each antenna. In the case where the selection technique can not be used, the switching technique can be used instead.

The switching technique operates as to switch to a different antenna (for example, a second or a third antenna) if a strength of a reception signal currently being received by one antenna (a first antenna) drops to below a threshold value. With the switching technique, quality of a reception signal can be improved in a similar fashion to that of the selection technique.

Implementation of the selection or the switching techniques can result in improvement of the signal quality in a fading environment where the strength of the reception signal changes over time, however, no improvement is realized in a static environment where a strength of the reception signal is not changed.

The in-phase combining technique operates such that the in-phase components of the signals received from each antenna are combined and the combined signal is used as a final receiving signal. By not simply selecting a signal but combining signals, the in-phase combining technique ensures an improvement of a signal quality greater than the selection or switching technique.

The in-phase combining technique requires a phase shifter for controlling a phase of a signal but can improve a received signal quality even in a static environment as well as in a fading environment.

The signals to be combined may have a big power difference, however, both signals contain a similar amount of noise component. Thus, combining the signals results in obtaining a small amount of gain and double the noise component, causing the signal-to-noise ratio of the combined signal to deteriorate.

A maximum ratio combining technique operates such that both the individual phases of received signals and the signal gains are controlled and then combined.

In the maximum ratio combining technique, when signals are received by each antenna, the powers of the received signals are detected, and the signal with greater power is more amplified while the smaller power signal is attenuated. The two signals S1 and S2 are then combined. The reason for amplifying (or attenuating) the signals prior to combining is to avoid problems of the in-phase combining technique as described above.

Accordingly, when a signal with less power is attenuated, the noise component is also attenuated and signal-to-noise ratio degradation of the combined signal can be prevented.

In spite of the advantages of having a great effect on improving signal quality, the maximum ratio combining technique is disadvantageous in that such a device is too complicate to be efficiently implemented and a large number of complicate calculations need to be made in comparison to other diversity techniques.

FIG. 1 illustrates a construction of a diversity receiving apparatus in accordance with the related art. This apparatus includes a phase shifter 10 for shifting a phase of a signal (first signal) received through a first antenna by 0°, 90°, 180° or 270°. A signal combiner 20 combines the phase-shifted first signal with a signal (second signal) received through a second antenna. A tuner 30 improves a signal-to-noise ratio of an output signal of the signal combiner 20 and prevents leakage of a radio wave. An amplifier 40 for amplifies an output signal of the tuner 30, and a frequency converter 50 converts a signal outputted from the amplifier 40 into an intermediate frequency (IF) signal An intermediate frequency amplifier 60 amplifies a signal of a certain frequency band centering around an intermediate frequency. A receiving electric field strength detector detects a strength of a signal outputted from the intermediate frequency amplifier, and a controller 80 controls the phase shifter 10 such that the detected strength of signal is optimized.

As the signal (the first signal) received through the first antenna passes through the phase shifter 10, it is phase-shifted by 0°, 90°, 180° or 270° and then transmitted to the signal combiner 20.

The signal combiner 20 in-phase combines the phase-shifted first signal with a signal (the second signal) received through the second antenna.

The combined signal sequentially passes through the tuner 30, the amplifier 40, the frequency converter 50 and then the intermediate frequency amplifier 60 so as to be down-converted into an IF signal.

The receiving signal strength detector 70 detects a strength of the combined signal which has passed through the intermediate frequency amplifier 60, and the controller 80 periodically shifts a phase of the phase shifter 10 so as to obtain the most powerful signal as measured by the receiving signal strength detector.

When the first and second signals are combined in a state in which they do not accurately have a phase difference of 0°, 90°, 180° or 270°, a combining loss is generated. This kind of signal combining is not considered, in the strict sense, an in-phase combining. However, the combining loss in this case is relatively insignificant.

The diversity receiving apparatus described above has several problems with respect to the in-phase combining technique.

First, in the case that the first and second signals have great differences in their power, a signal-to-noise ratio of the combined signal outputted from the signal combiner 20 is rather deteriorated.

Also, the loss of signal generated in the phase shifter and the signal combiner 20 increases an overall noise figure of a receiving apparatus. This degrades a receive sensitivity, resulting in reduced improvement receiving signal quality.

If the signal loss generated in the phase shifter 10 depends on a phase variation amount, when a phase of a received signal is shifted, the size of the received signal is also changed. Actually, because the phase shifter continuously performs the phase shifting, it generates a noise in the received signal and degrades signal quality.

In addition, because the signal loss due to the phase shifter 10 occurs only in the signal (first signal) received by the first antenna, an imbalance of an average power of the first signal and the second signal causes degredation of the diversity reception performance.

SUMMARY OF THE INVENTION

An object of the invention is to solve at least the above problems and/or disadvantages and to provide at least the advantages described hereinafter.

Therefore, an object of the present invention is to provide an in-phase combining diversity receiving apparatus and method capable of controlling a size (gain) of a receiving signal as well as a phase of the signal.

To achieve at least the above objects, there is provided a diversity receiving apparatus including a first signal adjusting unit for amplifying and phase-shifting a first signal received by a first antenna, and a second signal adjusting unit for amplifying and phase-shifting a second signal received by a second antenna. A combiner combines output signals of the first and second signal adjusting units and a frequency converter converts the combined signal into an intermediate frequency (IF) signal. An IF signal processor processes the IF signal according to an IF signal processing routine and converts it into a baseband signal. A controller measures powers of an original receiving signal, the first signal and the second signal, on the basis of the baseband signal, and controls the first and second signal adjusting units.

The first and second signal adjusting units perform the functions of both an amplifier and a phase shifter.

To achieve at least these advantages, there is also provided a diversity receiving method which performs amplifying first and second signals received through different antennas, shifting phases of the amplified first and second signals and combining the phase-shifted first and second signals. The combined signal in converted into an IF signal, and the IF signal is converted into a baseband signal. The powers of an original receiving signal, a first signal and a second signal are measured on the basis of the baseband signal, and amplifying and phase-shifting are controlled on the basis of the measured powers.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a flow chart of an in-phase combining diversity receiving method in accordance with the embodiment of the present invention.

DETAILED DESCRIPTION OF PREFERRED EMBODIMENTS

Figure 1:
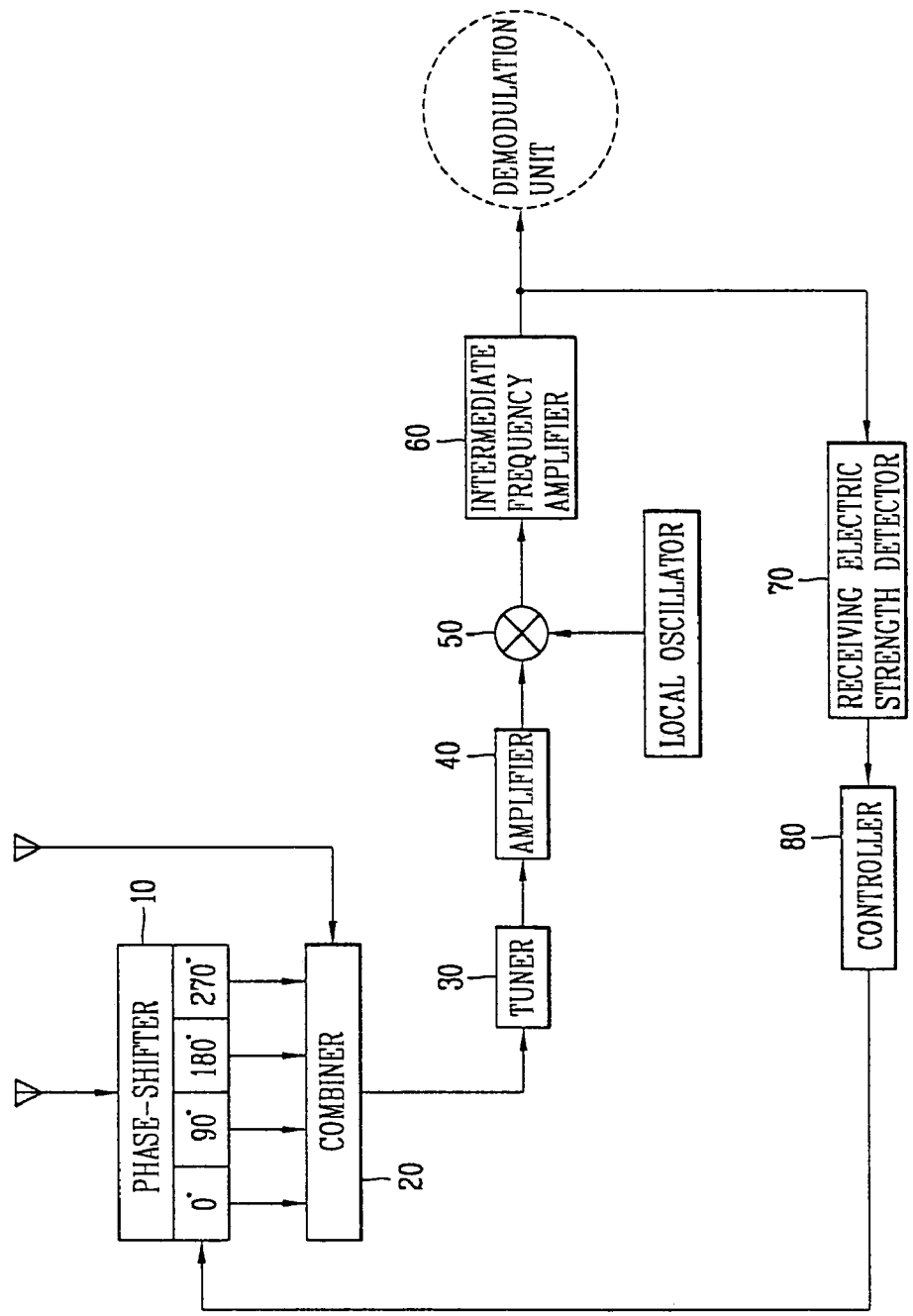
FIG. 1 illustrates a diversity receiving apparatus in accordance with a related art.
Figure 2:
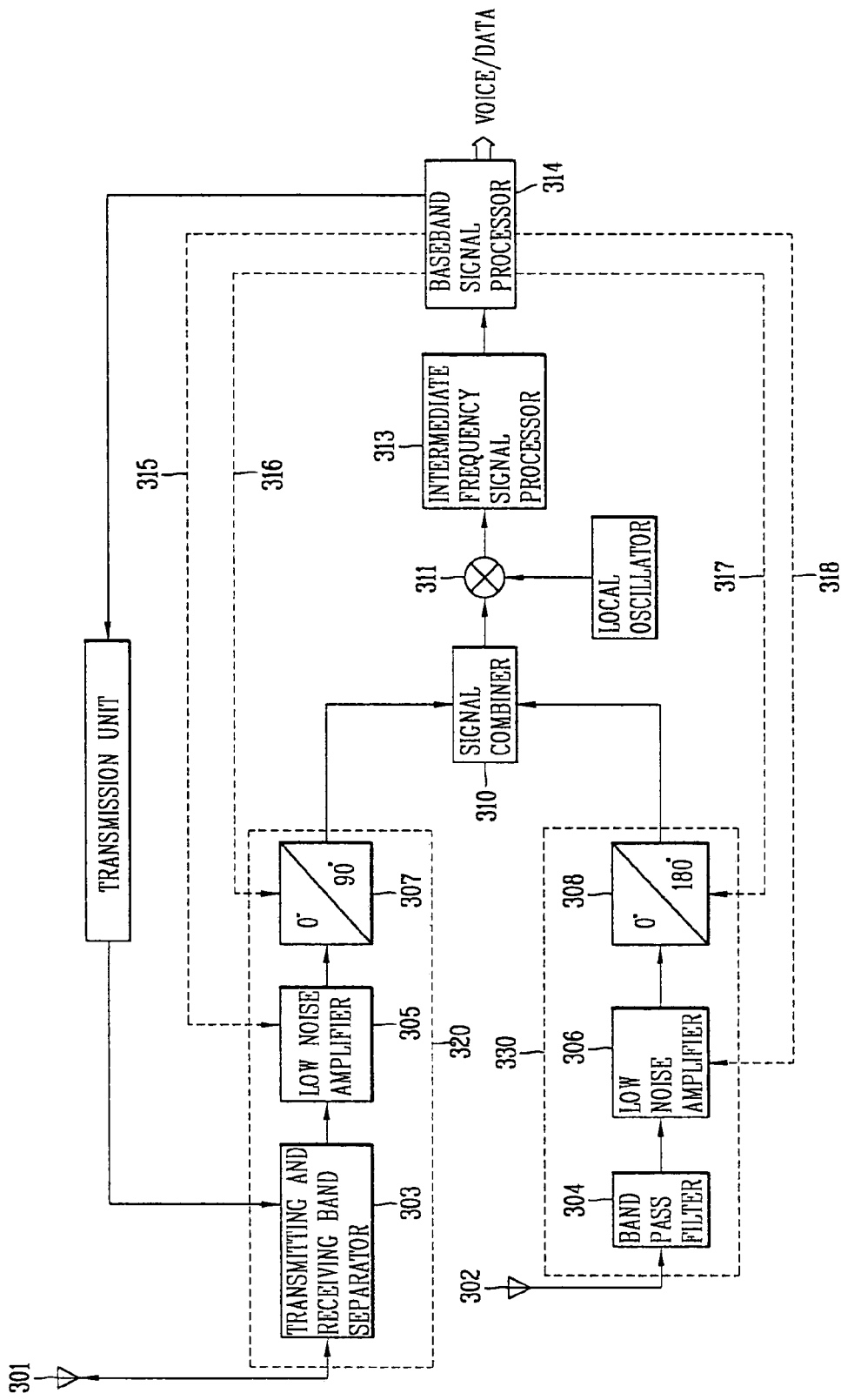
FIG. 2 illustrates a construction of an in-phase combining diversity receiving apparatus in accordance with an embodiment of the present invention.

FIG. 2 illustrates an in-phase combining diversity receiving apparatus in accordance with an embodiment of the present invention.

As shown in FIG. 2, an in-phase combining diversity receiving apparatus includes a first signal adjusting unit 320 for amplifying a signal (hereinafter 'first signal') received by a first antenna 301 and phase-shifting. The amplified first signal and a second signal adjusting unit 330 for amplifying a signal ('second signal') received by a second antenna 302 and phase-shifting. The amplified second signal and a signal combiner 310 for combining output signals of the first and second signal adjusting units 320 and 330. A frequency converter 311 converts the combined signal into an intermediate frequency (IF) signal and an IF signal processor 313 processes the IF signal according to an IF signal processing routine and converts it into a baseband signal. A baseband signal processor and controller 314 measures powers of an original receiving signal, the first signal and the second signal, on the basis of the baseband signal, and controls the first and second signal adjusting units 320 and 330.

The aforementioned 'original' signal refers to a signal received by the antenna (the first or the second antenna), which is not yet processed (e.g., signal combining and phase shifting).

The first signal adjusting unit 320 and the second signal adjusting unit 330 are both a low-noise amplifier and a phase-shifter.

The transmitting and receiving band separator 303 separates a frequency band of a transmitting or a receiving signal so that a signal can be transmitted and received through antenna.

The low-noise amplifiers 305 and 306 are radio frequency amplifiers aimed at reducing an overall noise figure of a receiving apparatus, and are used to amplify a receiving radio wave with an infinitesimal voltage. The low-noise amplifiers 305 and 306 control gains of the first and second signals according to gain control signals of the controller 314.

The phase shifter 307 performs a phase shifting of 0° or 90°, while the phase shifter 308 performs a phase shifting of 0° or 180°, according to phase control signals from the controller 314.

For example, when a gain control signal 315 has a normal level ('1'), the gains of the low-noise amplifiers 305 and 306 are 15 dB (gain range of 12~18 dB). When the gain control signal 315 has a low level ('0'), the gains of the low-noise amplifiers 305 and 306 are −10 dB (gain range of −7~−13 dB).

The signal combiner 310 combines the output signals of the two phase shifters 307 and 308 and outputs the combined signal into frequency converter 311.

The frequency converter 311, which converts a radio frequency (RF) signal into an intermediate frequency (IF) signal, receives the output signal of the signal combiner 310.

Radio frequency signals are susceptible to ambient noise and interference, and should be processed at a very high speed in a high frequency band. However, at the present time, it is virtually impossible to process signals at high speed (e.g., signal interpretation or signal generation) in the radio frequency band. Therefore, the radio signal is converted into an intermediate frequency (IF) signal and then a low frequency band (baseband) signal, and various signal processes are performed in the low frequency band.

The IF signal processor 313 amplifies the IF signal of the frequency converter 311, and filters it to extract a baseband signal.

The controller 314 processes the baseband signal (a data signal or a voice signal) of the IF signal processor 313. The baseband signal is complementary to a carrier band signal and refers to a non-modulated original information signal. The baseband signal has a frequency component usually ranging from a DC component (0 Hz) to an AC band.

The controller 314 measures a power of an output signal of the IF signal processor 313. The controller 314 optimizes the diversity receiving apparatus by using the power information of the measured signal, including the power information of a receiving signal, a phase control signal and a gain control signal.

A band pass filter 304 passes signals existing in a specific frequency range and removes signals outside of this range.

FIG. 3 is a flow chart of an in-phase combining diversity receiving method in accordance with the preferred embodiment of the present invention.

As shown in FIG. 3, the in-phase combining diversity receiving method of the present invention includes a first step of amplifying first and second signals received through different antennas. A second step of phase-shifting the amplified first and second signals. A third step of combining the phase-shifted first and second amplified signals. A fourth step of converting the combined signal into an IF signal. A fifth step of converting the IF signal into a baseband signal, and a sixth step of measuring powers of an original receiving signal, the first signal and the second signal, on the basis of the baseband signal, and controlling amplifying and phase-shifting parameters.

The first signal passes through the transmitting and receiving band separator 303, the low noise amplifier 305 and the phase shifter 307, and is inputted to the signal combiner 310.

The second signal is input to the signal combiner 310 after passing through the band pass filter 304, the low noise amplifier 306 and the phase shifter 308.

The output of the signal combiner 310 is input to the controller 314 after passing through the frequency converter 311 and the IF signal processor 313.

The process with which the controller 314 determines the gain control signals 315 and 318 that optimize the diversity receiving state is now described.

When signals are received by the first and the second antennas 301 and 302, the controller 314 outputs a gain control signal '1' to the low noise amplifier 305 and a gain control signal '0' to the low noise amplifier 306, and measures power of the baseband signal which is indicative of the power of the first signal.

Next, the controller 314 outputs the gain control signal of '0' to the low noise amplifier 305 and the gain control signal '1' to the low noise amplifier 306, and measures power of the baseband signal which is indicative of the power of the second signal.

The power of the first signal is the power of the signal outputted from the IF signal processor 313 when the low noise amplifier 305 operates according to a normal level control signal and the low noise amplifier 306 operates according to a low level control signal.

The power of the second signal is the power of the signal outputted from the IF signal processor 313 when the low noise amplifier 305 operates according to a low level control signal and the low noise amplifier 306 operates according to a normal level control signal.

If the power difference between the first and the second signals is smaller than a pre-set threshold value, the controller 314 outputs the gain control signal '1' to both low noise amplifiers 305 and 306. The controller 314 then adjusts the phase control signals 316 and 317 to optimize a diversity receiving state.

If the power difference between the first and second signals is greater than the threshold value, the controller 314 outputs the gain control signal '1' to the low noise amplifier amplifying a received signal with a higher power and a gain control signal '0' to the low noise amplifier amplifying a received signal with a lower power.

That is, the signal with the higher strength is amplified more while the signal with the low strength is attenuated. By doing so, the signal-to-noise ratio degradation generated from the signal combiner 310 due to the big power difference between the two receiving signals can be mitigated.

The reason that the controller 314 uses the gain control signals '1' and '0' to measure the power of the receiving signal is because the controller 314 measures the powers of the two receiving signals after the two receiving signals have been combined. By increasing a gain of a receiving signal to be measured to a certain rate while decreasing a gain of the other receiving signal to a certain rate, more reliable powers value can be obtained.

The process with which the controller 314 determines the phase control signals 316 and 317 that optimize the diversity receiving state is now described.

When signals are receive by the first and second antennas 301 and 302, the controller 314 does not phase-shift the first and second signals, but instead measures the power of the signal outputted from the IF signal processor 313.

Then, the controller phase-shifts the first and second signals so as to have a phase difference of $\alpha+90°$ therebetween, and measures the resultant power of the signal outputted from the IF signal processor 313.

Subsequently, the controller phase-shifts the first and second signals so as to have a phase difference of $\alpha-90°$ therebetween, and measures the resultant power of the signal outputted from the IF signal processor 313.

Thereafter, the controller 314 compares the three measured power values and controls the phase shifters 307 and 308 to adjust the phase difference between the first and the second signals to be a phase difference corresponding to the largest power value.

For example, if the power of the signal outputted from the IF signal processor 313 is most powerful when a phase difference between the first and second signals is $\alpha+90°$, the controller 314 controls the phase shifters 307 and 308 to set the phase difference between the first signal and the second signals at $\alpha+90°$, where $\alpha$ is the non phase-shifted phase difference between the first and the second signals.

In the diversity receiving apparatus of the present invention, the phase shifters 307 and 308 are positioned to be the stage following the low noise amplifiers 305 and 306, so that even if a signal loss is generated from the phase shifters 307 and 308, it has little influence on the overall noise figure of the receiving apparatus.

In the diversity receiving apparatus of the present invention, two phase shifters 307 and 308 perform four phase shift variations, improving the performance of one phase shifter performing four phase shifts (e.g., 0°, 90°, 180° and 270°). That is, the phase shifter 307 performs the phase-shifting of 0° and 90°, while the phase shifter 308 performs the phase-shifting of 0° and 180°. Accordingly, the two phase shifters 307 and 308 perform in combination the phase shifts of 0°, +90°, +180° and −90°.

The phase shifters 307 and 308 have a simple structure advantageous for reducing a signal loss. Thus, it makes even less influence on the overall noise figure of the receiving apparatus, and a signal quality degradation due to a change in the signal power is improved.

In addition, because the first signal and the second signal pass through the phase shifters 307 and 308 respectively along different paths, the matter of an imbalance in the power of the received signal is abated.

As so far described, the in-phase combining diversity receiving apparatus and method of the present invention have the following advantages.

The signal loss and the signal power change caused by the phase shifting process are reduced, such that signal quality is not degraded.

In addition, the signal-to-noise ratio degradation caused by the large power difference between signals received through the first and second antennas is resolved, thereby improving signal quality.

The present invention can be also applied to a communication system of various modulation methods operated in a multipath fading environment, not limited to a CDMA communication system.

Application of a diversity receiving apparatus in accordance with the present invention to the HDR system accomplishes a high price-to-performance effect by adding a minimum amount of circuitry.

The foregoing embodiments and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An in-phase combining diversity receiving apparatus comprises:

a first signal adjusting unit for amplifying a first signal received by a first antenna and phase-shifting said amplified first signal;

a second signal adjusting unit for amplifying a second signal received by a second antenna and phase-shifting said amplified second signal;

a combiner for combining output signals of the first and second signal adjusting units;

a frequency converter for converting the combined signal into an intermediate frequency (IF) signal;

an IF signal processor for processing the IF signal and converting it into a baseband signal; and a controller for measuring powers of an original receiving signal, the first signal and the second signal on the basis of the baseband signal, and controlling the first and second signal adjusting units, wherein the controller controls the first and second signal adjusting units so that if a measured power difference between the first and the second signals is greater than a threshold value, the signal with a stronger power is amplified to a normal level, while the signal with a weaker power is amplified to a low level.

2. The apparatus of claim 1, wherein the first signal adjusting unit comprises:

a first amplifier for amplifying the first signal; and a first phase shifter for shifting a phase of the signal outputted from the first amplifier.

3. The apparatus of claim 2, wherein the first phase shifter performs a phase-shifting of 0° or 90°.

4. The apparatus of claim 1, wherein the second signal adjusting unit comprises:

a second amplifier for amplifying the second signal; and a second phase shifter for shifting a phase of the signal outputted from the second amplifier.

5. The apparatus of claim 4, wherein the second phase shifter performs a phase-shifting of 0° or 180°.

6. The apparatus of claim 1, wherein amplification to the normal level has a gain in the range of 12~dB, while amplification to the low level has a gain in the range of −7~13 dB.

7. The apparatus of claim 1, wherein the controller controls the first and second signal adjusting units so that if a measured power difference between the first and the second signals is smaller than a threshold value, both the first and the second signals are amplified to a normal level.

8. The apparatus of claim 7, wherein amplification to the normal level has a gain in the range of 12~18 dB.

9. The apparatus of claim 1, wherein the controller measures power of the first signal by controlling the first and the second signal adjusting units so that the first signal is amplified to the normal level while the second signal is amplified to the low level, and also measures power of the second signal by controlling the first and the second signal adjusting units so that the first signal is amplified to the low level while the second signal is amplified to the normal level.

10. The apparatus of claim 9, wherein amplification to the normal level has a gain in the range of 12~18 dB, while amplification to the low level has a gain in the range of −7~−13 dB.

11. The apparatus of claim 1, wherein the controller measures power of a receiving signal according to a current phase difference ($\alpha$) between the first and the second signals, power of a receiving signal according to a phase difference $\alpha+90°$, and power of a receiving signal according to a phase difference of $\alpha-90°$, compares the measured powers, and controls the phase shift of the first and second signal adjusting units so that a phase difference between the first and second signals can be a phase difference corresponding to the strongest measured power.

12. An in-phase combining diversity receiving apparatus comprising:
- a first amplifier for amplifying a first signal received by a first antenna;
- a first phase shifter for shifting a phase of a signal outputted from the first amplifier;
- a second amplifier for amplifying a second signal received by a second antenna;
- a second phase shifter for shifting a phase of a signal outputted from the second amplifier;
- a signal combiner for combining output signals of the first and second phase shifters;
- a frequency converter for converting the combined signal into an IF signal;
- an IF signal processor for processing the IF signal and converting it into a baseband signal; and
- a controller for measuring powers of an original receiving signal, the first signal and the second signal on the basis of the baseband signal and controlling the first and the second amplifiers and the first and second phase shifters,
- wherein the controller controls the first and second amplifications so that if the measured power difference between the first and the second signals is greater than a threshold value, the signal with a stronger power is amplified to a normal level, while the signal with a weaker power is amplified to a low level.

13. The apparatus of claim 12, wherein amplification to the normal level has a gain in the range of 12~18 dB, while amplification to the low level has a gain in the range of −7~13 dB.

14. The apparatus of claim 12, wherein the controller controls the first and second amplifiers so that if the measured power difference between the first and the second signals is smaller than a threshold value, both the first and the second signals are amplified to a normal level.

15. The apparatus of claim 14, wherein amplification to the normal level has a gain in the range of 12~18 dB.

16. The apparatus of claim 12, wherein the controller controls the first amplifier to perform a normal level amplifying and the second amplifier to perform a low level amplifying when the power of the first signal is measured, and the controller controls the first amplifier to perform a low level amplifying and the second amplifier to perform a normal level amplifying when the power of the second signal is measured.

17. The apparatus of claim 16, wherein amplification to the normal level has a gain in the range of 12~18 dB, while amplification to the low level has a gain in the range of −7~−13 dB.

18. The apparatus of claim 12, wherein the controller measures power of a receiving signal according to a current phase difference ($\alpha$) between the first and the second signals, power of a receiving signal according to a phase difference $\alpha+90°$, and power of a receiving signal according to a phase difference of $\alpha-90°$, compares the measured powers, and controls the first and second phase shifters so that a phase difference between the first and second signals can be a phase difference corresponding to the strongest measured power.

19. The apparatus of claim 12, wherein the first phase shifter performs a phase-shifting of 0° or 90°.

20. The apparatus of claim 12, wherein the second phase shifter performs a phase-shifting of 0° or 180°.

21. An in-phase combining diversity receiving method comprising:
- amplifying first and second signals received through different antennas;
- shifting phases of the amplified first and second signals;
- combining the phase-shifted signals;
- converting the combined signal into an IF signal;
- converting the IF signal into a baseband signal;
- measuring powers of an original receiving signal, the first signal and the second signal on the basis of the baseband signal; and
- controlling amplifying and phase-shifting parameters, the controlling comprising comparing the power difference between the first and second signals and a threshold value; and amplifying the first and second signals to a normal level or to a low level according to a comparison result,
- wherein if the power difference between the first and the second signals is greater than the threshold value, the signal with a stronger power is amplified to a normal level, while the signal with a weaker power is amplified to a low level.

22. The method of claim 21, wherein if the power difference between the first and the second signals is smaller than the threshold value, both the first and second signals are amplified to a normal level.

23. The method of claim 21, wherein the controlling the phase shifting comprises:
- measuring a power of a receiving signal according to a current phase difference ($\alpha$) between the first and the second signals, a power of a receiving signal according to a phase difference $\alpha+90°$, and a power of a receiving signal according to a phase difference of $\alpha-90°$, and
- performing a phase-shifting so that a phase difference between the first and second signals can be a phase difference corresponding to the strongest measured power.

24. The method of claim 21, wherein the first signal is phase-shifted by 0° or 90°.

25. The method of claim 21, wherein the second signal is phase-shifted by 0° or 180°.

26. A method of receiving and combining a plurality of signals, comprising:
- receiving a plurality of signals;
- amplifying each of said plurality of signals;
- phase-shifting each of said amplified plurality of signals;
- combining said phase-shifted and amplified plurality of signals into a combined signal;
- measuring a power of said combined signal; and
- controlling said amplifying and phase-shifting, the controlling comprising determining power difference between the plurality of signals, comparing the power difference to a threshold value, and adjusting gain control signals for amplifying each of the plurality of signals whereby power difference between the plurality of signals is reduced,
- wherein said amplifying of each of said plurality of signals and said phase-shifting of each of said amplified plurality of signals are controlled according to said measured power.

27. The method of claim 26, wherein said determining power difference between the plurality of signals further comprises:
- increasing gain of one of said plurality of signals;
- decreasing gain of remainder of said plurality of signals;
- combining said increased gain signal and said decreased gain signals;

measuring a power of said combined increased and decreased gain signals indicative of a power of said one of said plurality of signals;

comparing said measured power indicative of a power of one of said plurality of signals to another measured power indicative of a power of another one of said plurality of signals to obtain a power difference.

28. The method of claim 26, wherein said controlling said phase-shifting further comprises:

measuring power of said combined signal for each combination of phase differences between each of said amplified plurality of signals; and selecting phase-shifting parameters corresponding to the strongest measured power.

* * * * *